United States Patent [19]

Lee et al.

[11] Patent Number: 4,976,937
[45] Date of Patent: Dec. 11, 1990

[54] SULFUR DIOXIDE REMOVAL FROM FLUE GASES WITH SULFITE OXIDATION INHIBITION

[75] Inventors: Yungli J. Lee, Pittsburgh; Lewis B. Benson, Corapolis; John W. College, Pittsburgh, all of Pa.

[73] Assignee: Dravo Lime Company, Pittsburgh, Pa.

[21] Appl. No.: 462,083

[22] Filed: Jan. 8, 1990

[51] Int. Cl.$^5$ ............................................... C01B 17/00
[52] U.S. Cl. ..................................... 423/242; 423/562
[58] Field of Search ............... 423/242 A, 242 R, 243, 423/562

[56] References Cited

U.S. PATENT DOCUMENTS

| | | | |
|---|---|---|---|
| 1,336,957 | 4/1920 | Hedenburg | 423/562 |
| 3,843,771 | 10/1974 | Urban | 423/242 |
| 3,906,080 | 9/1975 | Gorin et al. | 423/242 |
| 3,914,378 | 10/1975 | Selmeczi | 423/242 |
| 3,919,394 | 11/1975 | Selmeczi | 423/242 |
| 4,690,805 | 9/1987 | Bhatia et al. | 423/224 |

OTHER PUBLICATIONS

"Thiosulfate Additives for Lime/Limestone Scrubbing", Gary T. Rochelle, et al., Tenth Symposium on Flue Gas Desulfurization, Atlanta, Ga., Nov. 1986.
"Reducing Gypsum Scale in Wet FGD Systems Using Thiosulfate", David R. Owens, et al. POWER, May 1988.

Primary Examiner—Gregory A. Heller
Attorney, Agent, or Firm—Parmelee, Miller, Welsh & Kratz

[57] ABSTRACT

A method for removing sulfur dioxide from flue gases in a wet scrubbing system where calcium thiosulfate and calcium polysulfides are formed by the reaction of lime and emulsified sulfur and the mixture added to a recycle tank of the wet scrubber where it reacts with sulfites and bisulfites in the scrubbing slurry to produce thiosulfates from the calcium polysulfides, with the slurry then returned to the scrubber. The mixture of calcium thiosulfate and calcium polysulfides may be formed in the lime slaking tank or lime storage tank of a lime scrubbing system or formed in a mixing tank and added to a lime or limestone scrubbing system.

12 Claims, 3 Drawing Sheets

SULFUR DIOXIDE REMOVAL FROM FLUE GASES WITH SULFITE OXIDATION INHIBITION

FIELD OF THE INVENTION

The present invention relates to a process for removing sulfur dioxide from flue gases using an aqueous slurry of alkaline earth metal components where an antioxidant is added to the system to minimize formation of scaling in a wet scrubber.

BACKGROUND OF THE INVENTION

The removal of sulfur dioxide from flue gases in a wet or liquid scrubbing system is well known and a commercially used system. Such scrubbing systems use alkaline earth metal components such as limestone, lime, or magnesium oxide or hydroxide. Preferably, the scrubbing slurry is formed from calcium hydroxide and magnesium hydroxide, such as, for example, is disclosed in U.S. Pat. Nos. 3,919,393, 3,919,394 and 3,914,378, all assigned to the assignee of the present invention.

Sulfite oxidation is a very important side reaction in flue gas desulfurization (FGD) processes using a lime or limestone aqueous scrubbing slurry. When the solid waste oxidation level is above 15%–20%, the solution will be saturated with gypsum. The gypsum saturated solution will cause some serious reliability problems such as scaling on scrubber internals and mist eliminators. Thiosulfate ($S_2O_3^{-2}$) has been indentified as a free radical scavenger which inhibits sulfite oxidation effectively, as discussed in "Thiosulfate as an Oxidation Inhibitor in Flue Gas Desulfurization Processes: A Review of R & D Results", G. T. Rochelle, et al., presented at the 9th Symposium on Flue Gas Desulfurization, Cincinnati, Ohio, Jun. 4–7, (1985). Today, it is a general practice to apply thiosulfate to wet scrubbers to enhance operating reliability. In addition to inhibiting sulfite oxidation, thiosulfate is also found to improve the dewatering characteristics of calcium sulfite/sulfate waste solids.

Currently, there are two lime slurry scrubbing power stations using sodium thiosulfate and at least six limestone slurry scrubbing power stations using emulsified sulfur, which reacts with sulfite to form thiosulfate, to reduce sulfite oxidation and in consequence to enhance operating reliability as discussed in "Results of Wet FGD Testing at EPRI's High-Sulfur Test Center", R. E. Moser, et al., presented at the First Combined FGD and Dry $SO_2$ control Symposium, St. Louis, Mo. October (1988). Sulfur addition, if high conversion to thiosulfate can be achieved, is preferred because of economical reasons. A very long residence time is usually necessary for high sulfur conversion to thiosulfate because of the slow reaction between sulfur and sulfite/bisulfite.

Thiosulfate has been produced by the reaction of sulfur and sulfite in neutral or alkaline media according to the equation:

$$S + SO_3^{-2} \rightarrow S_2O_3^{-2} \quad (1)$$

Because of the equilibrium between sulfite and bisulfite:

$$HSO_3^- \rightarrow H^+ + SO_3^{-2} \quad (2)$$

alkalinity is necessary to enhance reaction (1) by removing the $H^+$ released from bisulfite. In addition, thiosulfate will decompose to sulfur and bisulfite in acidic solution:

$$S_2O_3^{-2} + H^+ \rightarrow S + HSO_3^- \quad (3)$$

which is essentially the reverse reaction of equation (1).

Reaction (1) is very slow primarily because of the low solubility (and slow dissolution rate) of sulfur in aqueous solution. It was found that when pH is above 5.0 and when the concentration of sulfite/bisulfite is greater than 80 ppm $SO_3^{-2}$, the reaction rate is independent of pH or sulfite concentration and is first order in sulfur solids concentration as discussed in "The Reaction of Colloidal Sulfur With Sulfite", G. W. Donaldson and F. J. Johnson, J. Phys. Chem. Vol. 73, pp. 2064–2068 (1969). At 131° F., a typical temperature at lime/limestone slurry scrubbers and recycle tanks, 0.04 $hr^{-1}$ was suggested for this first order kinetic constant (Rochelle et al., "Thiosulfate Additives for Lime/Limestone Scrubbing", EPA-600/9-87-004b, February 1987).

One way to facilitate the production of thiosulfate is using polysulfides instead of sulfur:

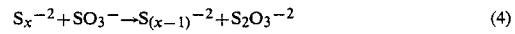

$$S_x^{-2} + SO_3^- \rightarrow S_{(x-1)}^{-2} + S_2O_3^{-2} \quad (4)$$

Polysulfides may be formed by dissolving sulfur in sulfide solutions (E. S. Gould, "Inorganic Reactions and Structures", Revised Ed. pp. 291–292, 1962). Reaction 4 is so fast that proton released by reaction 2, in some instances, cannot be neutralized immediately. The consequence is the formation of a "local" low pH spot despite the alkaline bulk solution and the generation of hydrogen sulfide ($H_2S$) that will cause serious odor problems. Because of this reason, polysulfide was abandoned in the EPA limestone scrubbing pilot plant at Research Triangle Park (RTP) although it was effective in producing thiosulfate in situ (Rochelle et al., 1987). However, if polysulfides are introduced to scrubbers together with lime slurries, the high pH of the feeding slurry and the scrubbing liquor as well as the fast dissolution of lime will neutralize the proton in reaction 2 effectively and therefore prevent the formation of $H_2S$.

One logical approach to produce thiosulfate in situ, is the alkaline hydrolysis of sulfur:

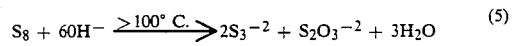

$$S_8 + 6OH^- \xrightarrow{\geq 100° C.} 2S_3^{-2} + S_2O_3^{-2} + 3H_2O \quad (5)$$

The major reason why this method is not tried is because of the sad fact that the extreme conditions (high pH and high temperature) required for reaction 5 are just not the characteristics of limestone slurry scrubbing systems. Because of the highly exothermic reaction of lime slaking, the temperature at the slaker is around 180° F. depending on the lime/water ratio, but the residence time is usually short. On the other hand, the temperature at the lime slurry storage tank is lower (100°–120° F.), but the residence time is substantially longer. A good conversion of sulfur to polysulfides-precursors of thiosulfate in slakers/lime slurry storage tanks, is achievable because of the characteristics of lime slurry scrubbing systems. This kind of conversion of sulfur to thiosulfate and its precursors-polysulfides, is therefore, the privilege of lime slurry scrubbing systems.

SUMMARY OF THE INVENTION

The present invention provides a method for removing sulfur dioxide from flue gases in a wet scrubber, using an aqueous slurry formed from an alkaline earth metal component such as limestone, lime or magnesium oxides or hydroxides, preferably a mixture of calcium hydroxide and magnesium hydroxide, which slurry also contains an antioxidant.

Calcium thiosulfate and calcium polysulfides are formed by the reaction of lime and emulsified sulfur and this mixture is added to a recycle tank of the wet scrubber where it reacts with sulfites and bisulfites in the scrubbing slurry to produce thiosulfates from the calcium polysulfides, with the slurry then returned to the wet scrubber.

The mixture of calcium thiosulfate and calcium polysulfides are preferably formed by reaction of lime and emulsified sulfur in a lime slaking tank used to charge the wet scrubbing system, with the reaction effected at a temperature of about 60°-100° C. Alternatively, the mixture of calcium thiosulfate and calcium polysulfides may be formed by reaction of lime and emulsified sulfur with a lime slurry in the lime slurry storage tank of the wet scrubbing system, which is usually at a temperature of between 40°-70° C.

In limestone scrubbing systems, the mixture of calcium thiosulfate and calcium polysulfides are formed by the reaction of lime and emulsified sulfur, and the mixture is added to the limestone slurry.

BRIEF DESCRIPTION OF THE DRAWINGS

The invention will be further understood by reference to the attached drawings of embodiments thereof, wherein.

DETAILED DESCRIPTION

The most logical way to produce thiosulfate in a lime slurry scrubbing system is to feed sulfur to the slaker or the lime slurry storage tank although special attention should be paid to the possible sublimation of sulfur in the slaker at "local" hot spots. The polysulfides will react readily with sulfite to form thiosulfates:

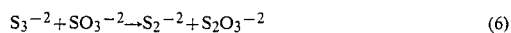 (6)

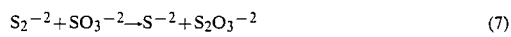 (7)

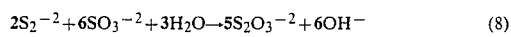 (8)

 (9)

Similar reactions occur with Bisulfites.

The unreacted sulfur leaving the lime slurry storage tank will react with sulfite in the scrubber and in the recycle tank to produce additional thiosulfate (rxn 1). Another "reactor" for thiosulfate production is the thickener. The conversion rate in the thickener will be low because of reduced temperature and agitation. But the long residence time provided in the thickener will result in some conversion to thiosulfate.

Figure 1:
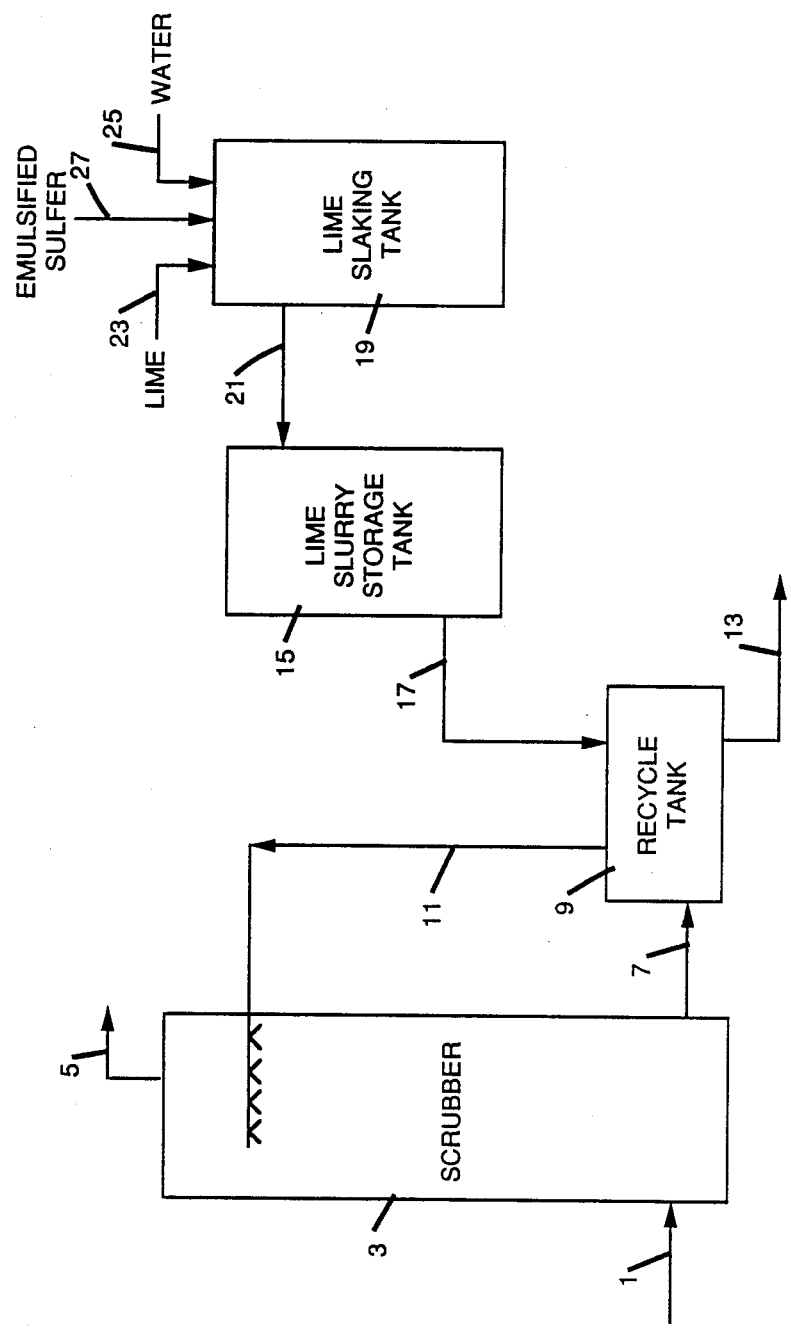
FIG. 1 is the schematic representation of the preferred embodiment of the present method wherein the mixture of calcium thiosulfate and calcium polysulfides are formed in a lime slaking tank of a lime scrubbing system.

Referring now to FIG. 1, the preferred embodiment of the present process is illustrated wherein flue gases from line 1 are charged to a wet scrubber 3, cleaned of sulfur dioxide therein and discharged through line 5. A sulfur dioxide scrubbing aqueous slurry is passed through the scrubber in contact with the flue gases, the slurry after such contact passed through line 7 to a recycle tank 9 from which scrubbing slurry is recycled to the scrubber 3 through line 11, as is conventional. A bleed stream, through line 13, is discharged from the recycle tank for solids control. Also, as is conventional, a lime slurry storage tank 15 is provided from which lime slurry is passed through line 17 to the recycle tanks 9 for replenishment of the scrubbing solution.

According to the present process, the lime slurry storage tank is charged from a lime slaking tank 19 through line 21. Calcium thiosulfate and calcium polysulfides are formed in the lime slaking tank by addition of lime through line 23, water through line 25, and emulsified sulfur through line 27. Emulsified sulfur is a form of commercially available sulfur that has a particle size of less than about 5 microns and is sold as a dispersion in water. One form of emulsified sulfur useful is sold by Georgia Gulf Sulfur under designation 70SD.

Since the slaking of lime is an exothermic reaction, the contents of the slaker will attain an elevated temperature, generally between about 60°-100° and more generally between about 82°-88° C. which aids in the ready formation of calcium polysulfides therein by reactions of the emulsified sulfur with the lime. A contact time period normally on the order of 5-25 minutes has been found suitable for formation of the desired components in the lime slaking tank. The slaked lime will normally have a concentration of lime in an amount of about 10 to 25 weight percent. The amount of emulsified sulfur added to the slaked lime in the lime slaking tank will be an amount sufficient to provide 0.5 to 20 millimoles of thiosulfate per liter of liquid contained in the wet scrubber. This amount is sufficient to substantially eliminate the oxidation of sulfur dioxide to sulfates and provide a scrubbing system that is non-scaling for gypsum.

Figure 2:
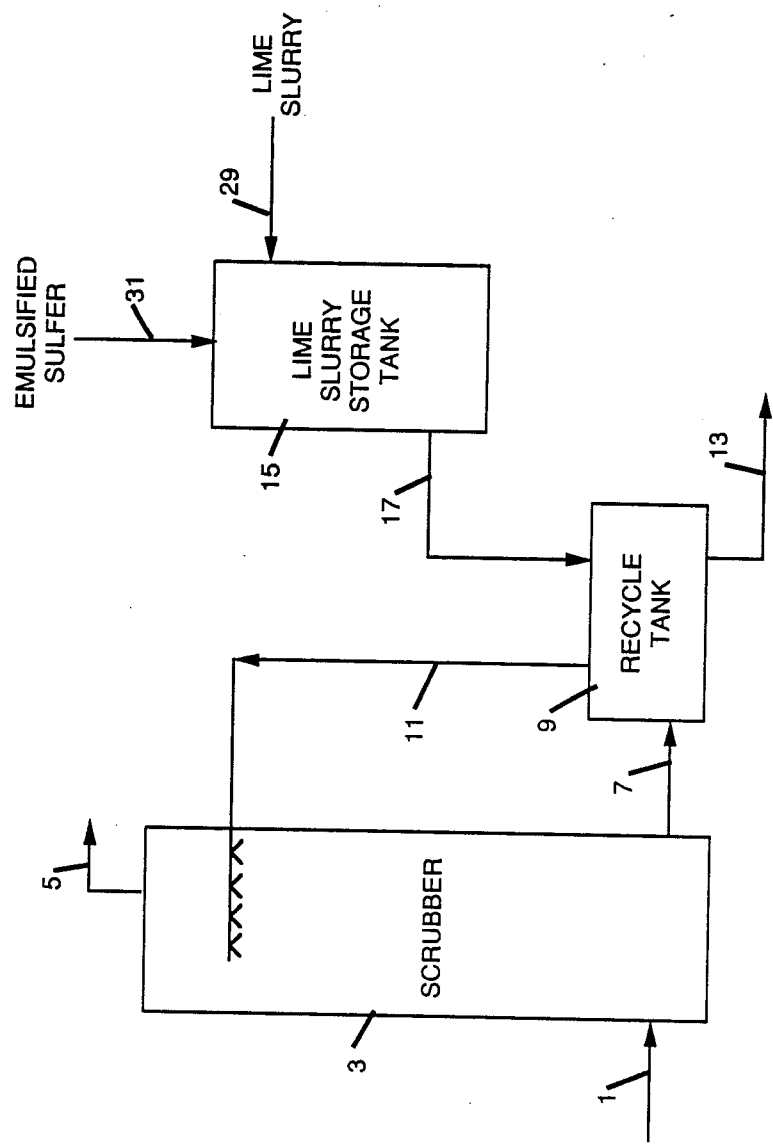
FIG. 2 is a schematic representation of another embodiment of the present method where the mixture of calcium thiosulfate and calcium polysulfides are formed in a lime slurry storage tank of a lime scrubbing system.

In an alternative embodiment illustrated in FIG. 2, the mixture of calcium thiosulfate and calcium polysulfides is formed in the lime slurry storage tank of the wet scrubbing system. Referring to FIG. 2, wherein like components carry the same numerical designations as FIG. 1, the flue gases are cleaned in the wet scrubber 3 and the scrubbing slurry fed to recycle tank 9 for recycle to the scrubber through line 11. Lime slurry from lime slurry storage tank 15 is charged to the recycle tank 9 to replenish the scrubbing slurry. A lime slurry is charged through line 29 to the lime slurry storage tank 15, while emulsified sulfur is charged thereto through line 31. The contents of the lime slurry storage tank 15 are usually at a temperature of between about 40°-70° C. with the desired reaction taking place at a time interval of about up to 8 hours.

Figure 3:
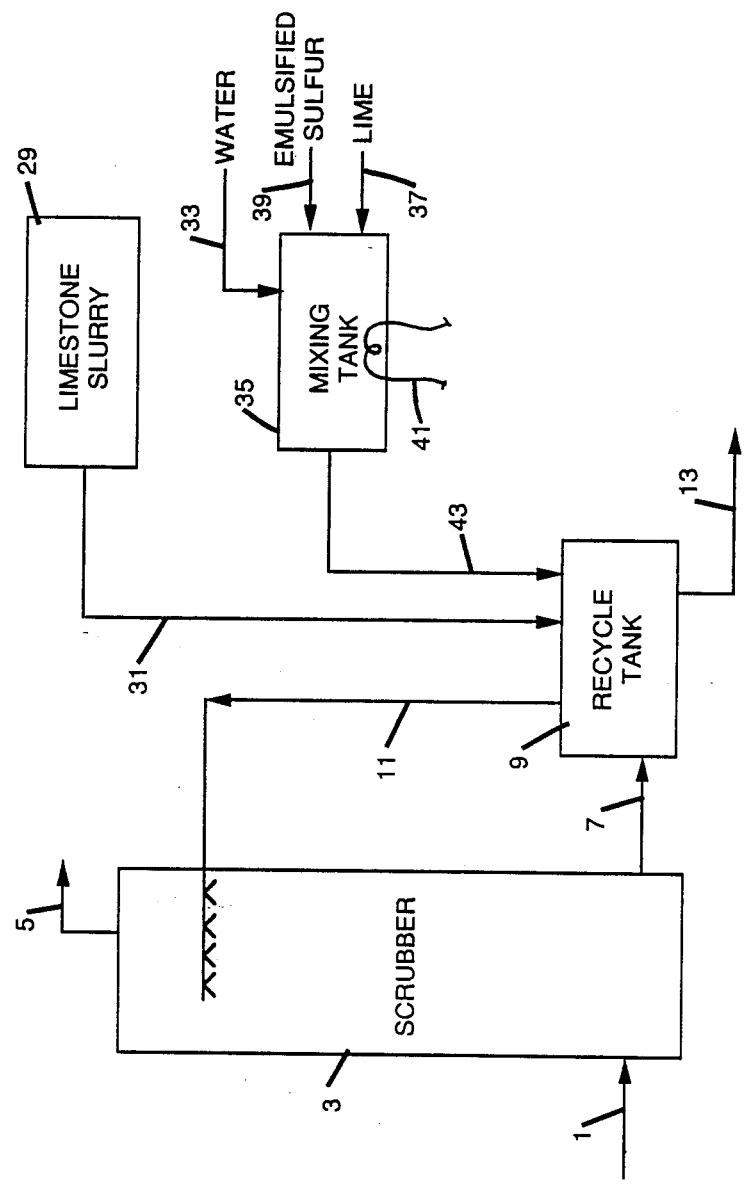
FIG. 3 is a schematic representation of a further embodiment of the present method where a mixture of calcium thiosulfate and calcium polysulfides are formed and added to a limestone slurry in a limestone scrubbing system.

In a further embodiment, where a limestone slurry is used as the scrubbing medium, illustrated is FIG. 3, the mixture of calcium thiosulfate and calcium polysulfides is formed and added to the limestone slurry fed to the scrubber unit. The components of FIG. 3 comparable to those of FIG. 1 are numbered alike. The limestone scrubbing slurry passes through the scrubber 3 and to recycle tank 9 for recirculation through the scrubber. A limestone scrubbing slurry from a source 29 is fed through line 31 to the recycle tank 9 to replenish spent scrubbing medium. Water is fed through line 33 to a mixing tank 35 while lime, preferably hydrated lime, is fed through line 37 and emulsified sulfur fed through line 39 to the mixing tank 35. In the mixing tank 35, the lime and emulsified sulfur are reacted to form a mixture of calcium thiosulfate and calcium polysulfides, preferably under heated conditions provided by a heater 41. The mixture so formed is then added to the limestone slurry recycle tank 9 through line 43.

The embodiment illustrated in FIG. 3 is also useful in a lime scrubbing system, where water through line 33 and lime through line 37 are charged to a mixing tank, along with emulsified sulfur through line 39. With the lime and emulsified sulfur reacted to form a mixture of calcium thiosulfate and calcium polysulfides, preferably with heating by heater 41. The mixture so formed would then be added to the lime slurry recycle tank 9 to provide the mixture of calcium thiosulfate and calcium polysulfides in the lime scrubbing system.

EXAMPLE

In a laboratory scale slaker, elemental sulfur (32 g powdered sulfur or 45.7 g 70 wt % emulsified sulfur) was added to the metal container to mix with 10 l preheated water (46° C.) first and 2 kg pebble lime was then fed to the water-sulfur mixture. The slurry temperature rose and then dropped from 81.5° C. (179° F.) to 72° C. (162° F.) over 25 minutes. The slurry was then diluted with water to make 8.4 wt % solids. The temperature was maintained at 44° C. (111° F.) by a heating tape and the slurry gently stirred for one hour. The slurry was then quenched with water to make 5.0 wt % slurry.

The conversion of sulfur to a mixture of calcium thiosulfate and calcium polysulfides was 78% and 21% for emulsified sulfur and powdered sulfur, respectively. A much smaller particle size of emulsified sulfur provided much more surface to react with lime and therefore resulted in a substantially higher conversion to available thiosulfate.

During the experiments, lime slurry and available thiosulfate were fed to the absorber separately. Separate feeding made the control of thiosulfate concentration independent of the lime slurry feed rate. A very light odor of emulsified sulfur was detected during the process of conducting experiments. However, it was not a problem. Mild calcium sulfite scaling occurred during oxidation inhibition by sodium thiosulfate or polysulfides while severe calcium sulfate scaling occurred in the absence of available thiosulfate. The calcium sulfate scaling increased the system pressure up to 40 psi by plugging the sparger and caused operating problems, such as poor heat transfer across the heat exchanger. On the other hand, the calcium sulfite scaling caused no system pressure buildup and no operating difficulties.

The operating parameters of each experiment are given in Table 1.

TABLE 1

| Exp. No. | System Pressure (psi) | Lime Rate (ml/min) | $S_2O_3^{-2}$ Rate (ml/min) | $S_2O_3^{-2}$ Conc. (ppm) | TOF[2] Rate (ml/min) | $SO_2$ Rate (ml/min) | Air Rate (ml/min) | $N_2$ Rate (ml/min) |
|---|---|---|---|---|---|---|---|---|
| F1: Baseline | 14 | 16.5 | 0.0 | 0 | 100 | 90 | 28800 | 28800 |
| F2 ($Na_2S_2O_3$) | 14 | 12.2 | 12.0 | 1600 | 100 | 90 | 28800 | 28800 |
| F3 ($Na_2S_2O_3$) | 4 | 12.2 | 17.8 | 1600 | 100 | 138 | 28800 | 28800 |
| F4 (Lime + S)[1] | 4 | 11.6 | 17.3 | 1600 | 100 | 132 | 28800 | 28800 |
| F5 (Lime + S) | 4 | 14.0 | 17.7 | 3200 | 100 | 158 | 28800 | 28800 |
| F6 (Lime + S) | 4 | 13.2 | 16.4 | 3500 | 100 | 158 | 0 | 58000 |

[1]Lime + S = Calcium Polysulfide
[2]TOF = Thickener Overflow

The analytical data of the flow system/sulfur addition tests are summarized in Table 2.

TABLE 2

| Exp. Time | pH | $Ca^{+2}$ (ppm) | $Mg^{+2}$ (ppm) | $Na_2S_2O_3$ (ppm) | $SO_3^{-2}$ (ppm) | $SO_4^{-2}$ (ppm) | TDS (wt %) | Suspended solid % (%) | $CaSO_4$ ($SO_3$ wt %) | $CaSO_3$ ($SO_2$ wt %) |
|---|---|---|---|---|---|---|---|---|---|---|
| F1 (Baseline, No $S_2O_3$) | | | | | | | | | | |
| 12:35 | 7.0 | 399 | 2046 | 0 | 720 | N/A | N/A | N/A | N/A | N/A |
| 14:00 | 6.9 | 618 | 1852 | 0 | 680 | N/A | N/A | N/A | N/A | N/A |
| 15:50 | 7.0 | 614 | 1840 | 0 | 578 | N/A | 3.60 | N/A | N/A | N/A |
| 16:45 | 7.0 | 330 | 2000 | 0 | 720 | 5885 | 3.62 | 4.1 | 48.1 | 5.8 |
| F2 ($Na_2S_2O_3$) | | | | | | | | | | |
| 09:50 | 7.1 | 128 | 2193 | 243 | 818 | N/A | N/A | N/A | N/A | N/A |
| 11:20 | 6.9 | 392 | 1875 | 182 | 514 | N/A | N/A | N/A | N/A | N/A |
| 13:00 | 7.0 | 352 | 2069 | 134 | 502 | 3814 | 1.66 | N/A | N/A | N/A |
| 14:05 | 6.5 | 721 | 1870 | 87 | 378 | N/A | N/A | N/A | N/A | N/A |
| 15:10 | 7.0 | 650 | 1729 | 111 | 236 | 3505 | 1.57 | N/A | 45.6 | 4.9 |
| F3 ($Na_2S_2O_3$) | | | | | | | | | | |
| 11:45 | 7.1 | 123 | 1961 | 237 | 1620 | 1759 | N/A | N/A | N/A | N/A |
| 12:45 | 7.1 | 169 | 1760 | 300 | 836 | N/A | N/A | N/A | N/A | N/A |
| 13:45 | 7.1 | 174 | 1716 | 284 | 824 | N/A | N/A | N/A | N/A | N/A |
| 14:50 | 7.1 | 190 | 1692 | 269 | 828 | 2686 | 1.56 | N/A | N/A | N/A |
| 15:45 | 7.1 | 176 | 1703 | 300 | 820 | 3450 | 1.37 | N/A | N/A | N/A |
| 16:50 | 7.1 | 169 | 1720 | 269 | 828 | 2106 | 1.40 | 2.8 | 8.7 | 39.9 |
| F4 (Lime + S) | | | | | | | | | | |
| 11:30 | 7.0 | 107 | 1684 | 221 | 1128 | N/A | N/A | N/A | N/A | N/A |
| 13:05 | 7.1 | 161 | 1566 | 237 | 944 | N/A | N/A | N/A | N/A | N/A |
| 14:05 | 7.1 | 156 | 1630 | 245 | 858 | N/A | N/A | N/A | N/A | N/A |

TABLE 2-continued

| Exp. Time | pH | $Ca^{+2}$ (ppm) | $Mg^{+2}$ (ppm) | $Na_2S_2O_3$ (ppm) | $SO_3^{-2}$ (ppm) | $SO_4^{-2}$ (ppm) | TDS (wt %) | Suspended solid % (%) | $CaSO_4$ ($SO_3$ wt %) | $CaSO_3$ ($SO_2$ wt %) |
|---|---|---|---|---|---|---|---|---|---|---|
| 15:05 | 6.9 | 148 | 1576 | 292 | 988 | 3087 | 1.25 | N/A | N/A | N/A |
| 16:05 | 7.0 | 159 | 1530 | 253 | 896 | 3262 | 1.25 | N/A | N/A | N/A |
| 16:45 | 7.0 | 149 | 1498 | 316 | 800 | 3210 | 1.26 | 2.5 | 8.6 | 40.8 |
| F5 (Lime + S) | | | | | | | | | | |
| 10:40 | 7.1 | 172 | 1888 | 458 | 948 | N/A | N/A | N/A | N/A | N/A |
| 11:55 | 7.0 | 74 | 1770 | 608 | 1174 | N/A | N/A | N/A | N/A | N/A |
| 12:45 | 7.1 | 99 | 1604 | 632 | 1136 | N/A | N/A | N/A | N/A | N/A |
| 14:00 | 7.1 | 82 | 1583 | 632 | 1184 | 2703 | 1.25 | 2.2 | N/A | N/A |
| 15:15 | 7.1 | 70 | 1442 | 751 | 1394 | 2184 | 1.23 | 2.7 | N/A | N/A |
| 16:15 | 7.0 | 107 | 1560 | 648 | 1236 | 2881 | 1.23 | 2.4 | 4.7 | 42.9 |
| F6 (Lime + S) | | | | | | | | | | |
| 10:10 | 7.0 | 146 | 1976 | 450 | 1249 | N/A | N/A | N/A | N/A | N/A |
| 11:10 | 7.0 | 88 | 1763 | 585 | 1516 | N/A | N/A | N/A | N/A | N/A |
| 12:15 | 7.1 | 63 | 1660 | 640 | 1622 | N/A | N/A | 2.2 | N/A | N/A |
| 13:15 | 7.1 | 54 | 1641 | 656 | 1650 | N/A | N/A | 2.4 | N/A | N/A |
| 14:15 | 7.0 | 58 | 1617 | 703 | 1743 | 2307 | 1.37 | 2.3 | N/A | N/A |
| 15:15 | 7.0 | 60 | 1674 | 711 | 1756 | 2486 | 1.35 | 2.3 | N/A | N/A |
| 16:15 | 7.0 | 57 | 1661 | 687 | 1698 | 2282 | 1.42 | 2.3 | 0.5 | 49.5 |

TDS = Total Dissolved Solids

Some experiments were performed with scrubber blowdown entering the thickener and with thickener overflow recycling back to the scrubber. Steady states of these experiments probably were never reached and the data of these experiments, except for the baseline (F1) without adding any form of thiosulfate, are not included in Table 2.

It is clearly indicated in Table 2 that the oxidation of sulfite can be suppressed by thiosulfate when thiosulfate concentration is higher than a certain level, the so-called threshold concentration. For example, Experiment F2, with 100 ppm $Na_2S_2O_3$, gives 45.6 wt % $SO_3$ only slightly lower than 48.1 wt % $SO_3$ in the absence of thiosulfate while Experiment F3, with 280 ppm $Na_2S_2O_3$, greatly reduces oxidation to 8.7 wt % $SO_3$. However, it should be pointed out that the data of Experiments F1 and F2 are probably not close to steady state values because of the severe scaling of gypsum that caused operating difficulties. Because of the plugging of the sparger and the heat exchanger tubing, the system was interfered several times during the course of these two experiments. Nevertheless, Experiments F1, F2 and F3 still clearly illustrate the effect of thiosulfate on inhibiting sulfite oxidation as well as the existence and the importance of the threshold concentration of thiosulfate.

Experiment F3 and F4 were performed under similar conditions except that the former used $Na_2S_2O_3$ directly and the latter used a mixture of polysulfides and thiosulfate, which were produced by alkaline hydrolysis of sulfur, as the source of thiosulfate. The results show practically no difference between these two experiments except that polysulfides slightly decreased calcium and increased sulfate but kept the oxidation level in the solids essentially unchanged. (8.6 wt % $SO_3$ vs 8.7 wt % $SO_3$).

It seemed that polysulfides reacted with sulfite fast enough to provide thiosulfate reliably. Fortunately, the absorption of $SO_2$ into lime slurry to supply sulfite for thiosulfate production was even faster. Therefore, the concentration of sulfite in the solution was maintained nearly constant.

Experiment F5, comparing with Experiment F4, revealed that more concentrated thiosulfate (650 vs 280 ppm) could suppress oxidation further and maintain sulfite concentration at a higher level (1240 vs 800 ppm).

According to the present process, the amount of the mixture of calcium thiosulfate and calcium polysulfides added to the scrubbing slurry is an amount that is sufficient to substantially eliminate the oxidation of sulfur dioxide to sulfates and thereby provide a scrubbing system that is non-scaling for gypsum.

We claim:

1. In a method for removal of sulfur dioxide from flue gases in a wet scrubber, wherein an aqueous alkaline earth metal component slurry is contacted in the wet scrubber with the flue gases and said slurry after said contact, containing sulfites and bisulfites, is passed to a recycle tank from which a portion thereof is discharged while the remainder is recycled to said wet scrubber, the improvement comprising:

forming a mixture of calcium thiosulfate and calcium polysulfides by reaction of lime and emulsified sulfur;

adding the mixture so formed to said recycle tank for reaction with the sulfites and bisulfites in said slurry so as to produce thiosulfates from said calcium polysulfides and provide 0.5 to 20 millimoles of thiosulfate per liter of liquid contained in the wet scrubber; and recycling said slurry from the recycle tank to said wet scrubber to remove sulfur dioxide from said flue gases.

2. The method as defined in claim 1, wherein said alkaline earth metal component slurry comprises a slurry formed from calcium hydroxide and magnesium hydroxide, and said forming the mixture of calcium thiosulfate and calcium polysulfides by reaction of lime and emulsified sulfur is effected by contacting emulsified sulfur with lime and water in a lime slaking tank.

3. The method as defined in claim 2, wherein the emulsified sulfur is contacted with said lime and water in said lime slaking tank at a temperature of between 60°-100° C. for a period of about 5-25 minutes.

4. The method as defined in claim 3, wherein said temperature is between 82°-88° C.

5. The method as defined in claim 1, wherein said alkaline earth metal component slurry comprises a slurry formed from calcium hydroxide and magnesium hydroxide and said forming the mixture of calcium thiosulfate and calcium polysulfides by reaction of lime and emulsified sulfur is effected by contacting emulsified sulfur with a lime slurry in a lime slurry storage tank.

6. The method as defined in claim 5, wherein the emulsified sulfur is contacted with said lime slurry in said lime slurry storage tank at a temperature of between 40°–70° C. for a period of up to 8 hours.

7. The method as defined in claim 1, wherein said alkaline earth metal component slurry comprises a slurry formed from calcium hydroxide and magnesium hydroxide, and said forming the mixture of calcium thiosulfate and calcium polysulfides by reaction of lime and emulsified sulfur is effected by contacting emulsified sulfur with water and lime in a mixing tank, and said mixture is added to the slurry.

8. The method as defined in claim 1, wherein said alkaline earth component slurry comprises a slurry formed from limestone and said forming the mixture of calcium thiosulfate and calcium polysulfides by reaction of lime and emulsified sulfur is effected by contacting emulsified sulfur, lime and water in a mixing tank, and said mixture is added to the limestone slurry.

9. In a method for removal of sulfur dioxide from flue gases in a wet scrubber, wherein slaked lime is formed in a lime slaking tank, and an aqueous slurry, formed from said slaked lime and magnesium hydroxide, is contacted in the wet scrubber with the flue gases and said slurry after said contact, containing sulfites and bisulfites, is passed to a recycle tank from which a portion thereof is discharged while the remainder is recycled to said wet scrubber, the improvement comprising:
   contacting emulsified sulfur with lime and water in the lime slaking tank during formation of the slaked lime prior to formation of said aqueous slurry so as to form a mixture of calcium thiosulfate and calcium polysulfides therein;
   adding said mixture of calcium thiosulfate and calcium polysulfides to said aqueous slurry for reaction with sulfites and bisulfites therein to produce thiosulfates from said calcium polysulfides and provide 0.5 to 2.0 millimoles of thiosulfate per liter of liquid in the wet scrubber; and
   recycling said slurry to said wet scrubber to remove sulfur dioxide from said flue gases.

10. In a method for removal of sulfur dioxide from flue gases in a wet scrubber, wherein an aqueous slurry formed from calcium hydroxide and magnesium hydroxide provided from a lime slurry storage tank is contacted in the wet scrubber with the flue gases and said slurry after said contact, containing sulfites and bisulfites, is passed to a recycle tank from which a portion thereof is discharged while the remainder is recycled to said wet scrubber, the improvement comprising:
   contacting emulsified sulfur with said aqueous slurry in said lime storage tank to form a mixture of calcium thiosulfate and calcium polysulfides therein;
   adding said aqueous slurry containing said mixture of calcium thiosulfate and calcium polysulfides to the recycle tank for reaction with sulfites and bisulfites in the slurry to produce thiosulfates from said calcium polysulfides and provide 0.5 to 20 millimoles of thiosulfate per liter of liquid in the wet scrubber; and
   recycling said slurry from the recycle tank to said wet scrubber to remove sulfur dioxide from said flue gases.

11. In a method for removal of sulfur dioxide from flue gases in a wet scrubber, wherein an aqueous slurry, formed from calcium hydroxide and magnesium hydroxide, is contacted in the wet scrubber with the flue gases and said slurry after said contact, containing sulfites and bisulfites, is passed to a recycle tank from which a portion thereof is discharged while the remainder is recycled to said wet scrubber, the improvement comprising:
   contacting emulsified sulfur with water and lime in a mixing tank to form a mixture of calcium thiosulfate and calcium polysulfides;
   adding said mixture so formed to the recycle tank for reaction with sulfites and bisulfites in the slurry to produce thiosulfates from said calcium polysulfides and provide 0.5 to 20 millimoles of thiosulfate per liter of liquid in the scrubber; and
   recycling said slurry from the recycle tank to said wet scrubber to remove sulfur dioxide from said flue gases.

12. In a method for removal of sulfur dioxide from flue gases in a wet scrubber, wherein an aqueous slurry formed from limestone is contacted in the wet scrubber with the flue gases and said slurry after contact, containing sulfites and bisulfite, is passed to a recycle tank from which a portion thereof is discharged while the remainder is recycled to said wet scrubber, the improvement comprising:
   contacting emulsified sulfur with water and lime in a mixing tank to form a mixture of calcium thiosulfate and calcium polysulfides;
   adding said mixture so formed to the recycle tank for reaction with sulfites and bisulfites in the slurry to produce thiosulfates from said calcium polysulfides and provide 0.5 to 2.0 millimoles of thiosulfate per liter of liquid in the wet scrubber; and
   recycling said slurry from the recycle tank to said wet scrubber to remove sulfur dioxide from said flue gases.

* * * * *

UNITED STATES PATENT OFFICE
CERTIFICATE OF CORRECTION

PATENT NO. : 4,976,937
DATED : DECEMBER 11, 1990
INVENTOR(S) : YUNGLI JOSEPH LEE, ET AL.

It is certified that error appears in the above-identified patent and that said Letters Patent is hereby corrected as shown below:

Column 9, line 44

"2.0" should be ---20---.

Column 10, line 50

"2.0" should be ---20---.

Signed and Sealed this

Twenty-eighth Day of April, 1992

Attest:

HARRY F. MANBECK, JR.

*Attesting Officer*          *Commissioner of Patents and Trademarks*